United States Patent [19]

Jenkins et al.

[11] 4,234,010
[45] Nov. 18, 1980

[54] SELF-CLEANING DUMP VALVE FOR CHEMICAL REACTOR TANK

[75] Inventors: Robert E. Jenkins, Ponchatoula, La.; Claude Acree, Lake Oswego, Oreg.

[73] Assignee: Georgia-Pacific Corporation, Atlanta, Ga.

[21] Appl. No.: 730,171

[22] Filed: Oct. 7, 1976

[51] Int. Cl.³ .......................... F16K 1/42; F16F 31/14
[52] U.S. Cl. ...................................... 137/242; 251/58; 251/144; 251/360; 251/DIG. 1; 251/333
[58] Field of Search .............. 251/144, 291, 293, 324, 251/359, 360–364, DIG. 1, 318–319, 325, 333, 332, 339; 137/242, 267, 581, 322, 350; 222/181, 185, 509–510, 322

[56] References Cited

U.S. PATENT DOCUMENTS

| | | | |
|---|---|---|---|
| 2,485,504 | 10/1949 | Morgan | 251/324X |
| 2,661,182 | 12/1953 | Kipp | 137/625.69 X |
| 2,704,650 | 3/1955 | Rand | 251/324 |
| 2,747,611 | 5/1956 | Hewitt | 137/625.69 |
| 2,752,941 | 7/1956 | Mitchell | 251/333 X |
| 2,791,238 | 5/1957 | Bryant | 251/333 X |
| 2,892,644 | 6/1959 | Collins | 251/333 X |
| 2,912,087 | 11/1959 | Kron et al. | 251/134 X |
| 2,953,345 | 9/1960 | Slemmons et al. | 251/144 |
| 3,370,827 | 2/1968 | Stehlin | 251/58 X |
| 3,955,796 | 5/1976 | Grove | 251/172 |
| 3,981,481 | 9/1976 | Reedy et al. | 251/144 |

Primary Examiner—Martin P. Schwadron
Assistant Examiner—Richard Gerard
Attorney, Agent, or Firm—Klarquist, Sparkman, Campbell, Leigh, Hall & Whinston

[57] ABSTRACT

A dump valve apparatus is described which may be used to drain a chemical reactor tank. The valve includes a valve seat ring having a substantially vertical inner seat surface defining a discharge passage, a valve plug having a substantially vertical outer side surface which fits in the seat ring and a seal formed between such vertical sealing surfaces. The valve inlet and outlet openings are aligned with the vertical discharge passage through the seat ring and the sealing surfaces are vertical to minimize the amount of material deposited thereon. The outer plug side surface slides across the inner seat surface during opening and closing of the valve so that such surfaces wipe each other to remove deposited material and provide a self-cleaning valve. The inner seat surface is provided with a plurality of annular grooves containing elastic sealing members which engage the outer plug side surface to form a liquid tight seal which is resistant to the pressure created by the liquid within the tank. An actuator rod attached to the valve plug extends through the outlet opening of the valve inside the discharge conduit and through the side of such discharge conduit to an external jack screw operating mechanism for raising and lowering the plug between its open and closed position.

12 Claims, 5 Drawing Figures

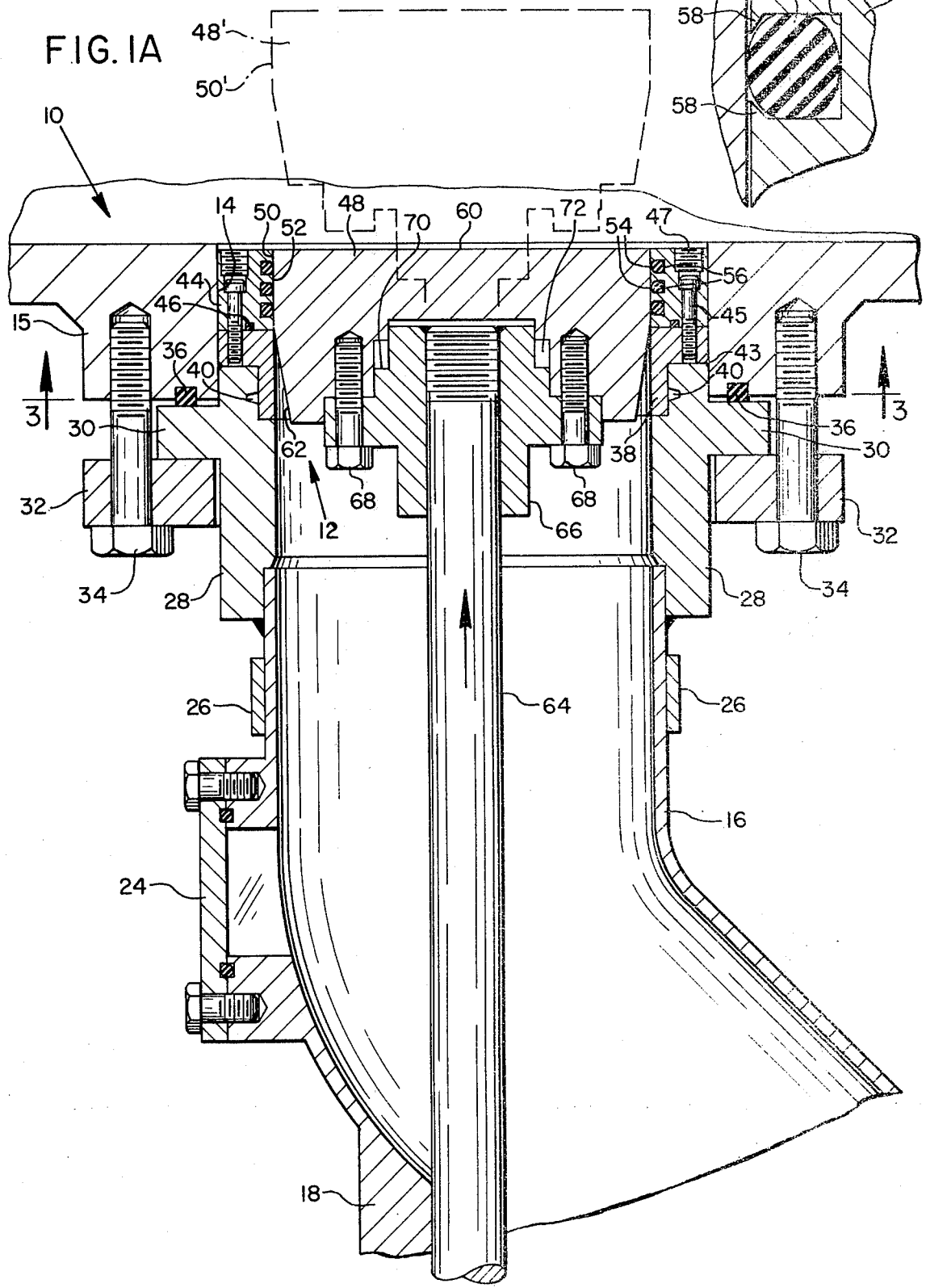

SELF-CLEANING DUMP VALVE FOR CHEMICAL REACTOR TANK

BACKGROUND OF THE INVENTION

The subject matter of the present invention relates generally to dump valves, and in particular to dump valves connected to the discharge port of a chemical reactor tank. The dump valve is self-cleaning and is provided with substantially vertical valve seat and valve plug sealing surfaces together with a sealing means for forming a liquid tight seal between such surfaces. As a result little material is deposited on the sealing surfaces since liquid flows off such surfaces due to gravity. In addition, any material deposited upon the surfaces is removed by the wiping action of such surfaces as they slide across each other during opening and closing of the valve. As a result, a reliable liquid tight seal is formed which is resistant to the pressure created by the liquid within the reactor tank, to high temperatures and to corrosive liquids such as that employed in the manufacture of polyvinyl chloride and other synthetic plastics.

In the manufacture of polyvinyl chloride and other polymeric products there are employed for converting the monomer to the polymer batch type reactors comprising a reactor tank or vessel fitted at the bottom with a discharge port and a communicating discharge conduit. During the reaction, the chemical liquids used for such reaction are contained in the vessel, and at the conclusion of the reaction the contents are discharged therefrom by operation of a dump valve mounted in the discharge port. Because of the corrosive nature of the reactants and the adverse reaction conditions employed, significant difficulties attend the operation of such a valve.

During the period of reaction, the dump valve must seal the opening completely to avoid the loss of chemicals, primarily liquid, under a static head of 20 to 40 tons at high termperatures and varying pressures. For example, in the manufacture of polyvinyl chloride the reactor valve is subjected to temperatures of about 200° F. and pressures ranging between negative pressures, during evacuation of the vessel, and positive working pressures of the order of 150 to 300 pounds per square inch while supporting static heads of over 25 tons.

Under these conditions of operation, it is difficult to maintain a tight seal and efficient operation of the valve, particularly in view of the fact that the discharge port and conduit in which the valve works is a foot or more in diameter, and in view further of the fact that the liquid polymeric product which is discharged may contain solid chunks or may harden into a solid coating that tends to be deposited on the valve plug and the valve seat to prevent tight closure of the valve.

SUMMARY OF THE INVENTION

Therefore one object of the present invention is to provide a dump valve apparatus which overcomes the foregoing problems and in which the valve operates efficiently with a minimum of maintenance over a long service life under conditions of high temperature and high pressure.

Another object of the invention is to provide such a dump valve which is self-cleaning and will not jam or leak.

A further object of the invention is to provide such a dump valve whose inlet and outlet openings, discharge passage and sealing surfaces are substantially vertical to minimize the amount of material deposited on such surfaces.

An additional object of the invention is to provide such a dump valve which can be opened and closed under high pressure by an actuator rod which extends through the outlet opening of the valve.

A still further object of the invention is to provide such a dump valve with a pressure resistant seal including a plurality of annular grooves in a substantially vertical inner valve seat surface, each groove containing an elastic sealing member which engages a substantially vertical outer side surface of the valve plug in the closed position of the valve.

Still another object of the present invention is the provision of a valved chemical reaction apparatus including a reactor tank provided with a dump valve which is of simple, rugged construction, which may be assembled and disassembled readily for servicing, which may be operated manually or by means of motors, which will open against high static heads and close against deposited material and which is essentially self-cleaning.

DRAWINGS

Other objects and advantages of the present invention will be apparent from the following description of a preferred embodiment thereof and from the attached drawings of which:

FIGS. 1A and 1B are progressive views in longitudinal section illustrating the dump valve apparatus of the invention attached to a chemical reaction tank;

FIG. 2 is an enlarged portion of FIG. 1A showing the seal between the valve plug and the valve seat;

DESCRIPTION OF PREFERRED EMBODIMENT

Figure 1B:
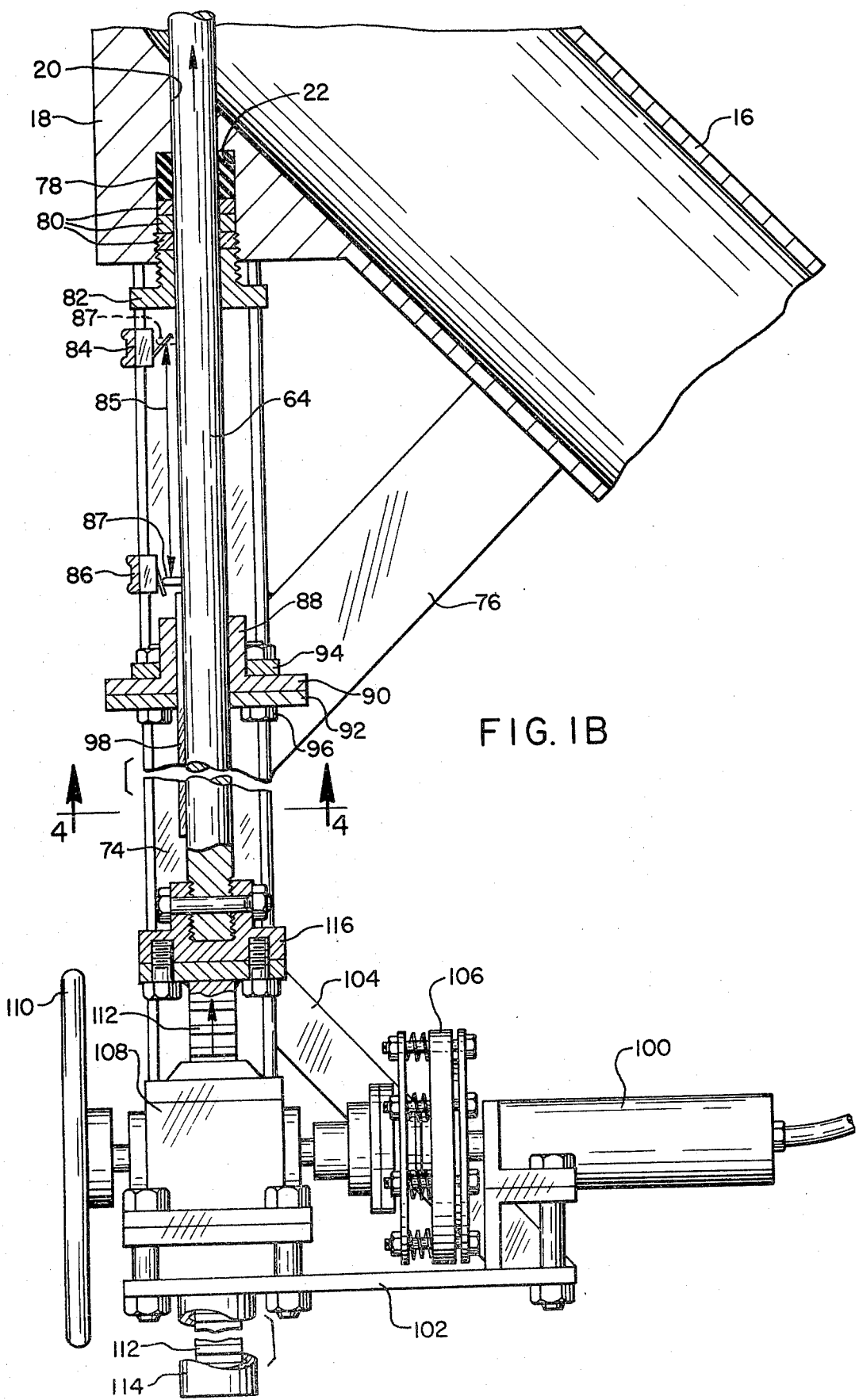

A chemical reactor tank 10 and a dump valve 12 made in accordance with the present invention for closing a discharge port 14 in the bottom of such tank are shown in FIG. 1A. As indicated above, the tank is of large volume having a capacity of several tons of reaction mixture. Where the contents of the reactor are highly corrosive, it may be fabricated from stainless steel or other suitable structural material. Means for charging the reactor, for heating or cooling it, and for applying any desired degree of negative or positive pressure, all not illustrated, may be included in the reactor assembly to suit the contemplated purpose.

The bottom of the reactor preferably is convexly arcuate and provided with a substantial boss 15 through which the tank discharge port 14 extends centrally of the boss. In view of the high capacity of the reactor, this port is of substantial diameter, for example 10 to 16 inches or even more.

A discharge conduit 16 communicates with the discharge port 14 to form a passageway into the interior of the tank. The conduit has a diameter slightly less than the diameter of port 14, and preferably is provided with an elbow bend a spaced distance below the port. Where the reactor is intended to contain corrosive materials, and is made of stainless steel, conduit 16 is fabricated from the same material.

As shown in FIG. 1B, conduit 16 is provided at its elbow segment with a downwardly extending boss 18. This boss is drilled to form a vertical bore 20 having an enlarged lower segment 22, the two parts of the bore being separated by a shoulder. The axis of bore 20-22 substantially aligns with the axis of the discharge port 14 of the reactor. Conduit 16 further is provided with a clean-out window 24 and a support ring 26.

Support means including a sleeve 28 is provided for connecting the upper end of discharge conduit 16 to reactor 10 in such a manner that the conduit communicates with port 14 of the latter. The sleeve 28 is welded at its lower end to the upper end of conduit 16 and is provided at its upper end with an external flange 30. A clamp ring 32 underlies the flange and has radially spaced drilled openings which accommodate bolts 34. These bolts are received in threaded engagement in registering drilled and tapped openings in the underface of boss 15, thus releasably clamping the conduit to the reactor. A rubber sealing ring 36 is interposed between the meeting faces of flange 30 and boss 15.

Sleeve 28 is multipurpose in that it not only provides connecting flange 30, but also provides means for mounting a lower valve seat member 38.

Figure 3:
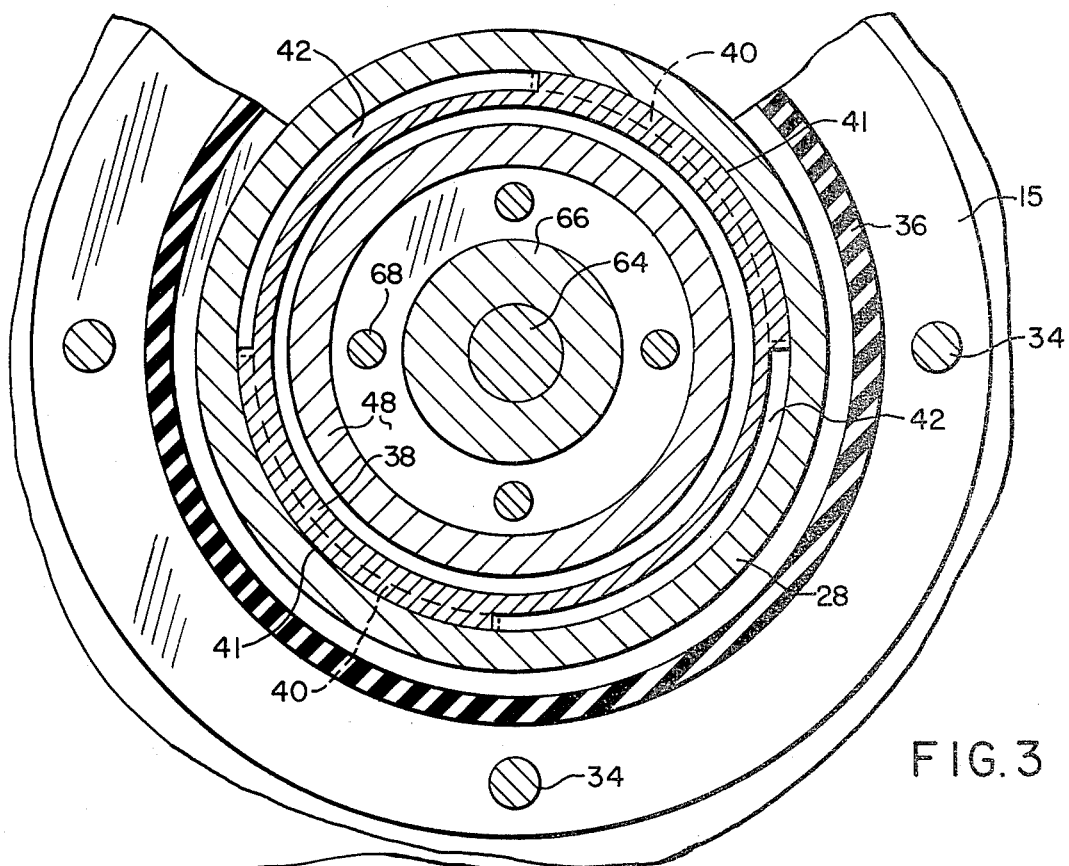
FIG. 3 is a transverse sectional view taken along line 3—3 of FIG. 1A illustrating the construction of the valve body.

The valve seat member 38 comprises an annular ring dimensioned to be received in the discharge port 14 and has a flat upper surface which serves as a sealing surface. The lower seat member 38 is provided with a downwardly extending shank portion on which are located two radially spaced locking teeth 40 which each extend approximately 85° about the shank axis. These teeth are inserted into radially spaced slots 42 in the sleeve 28, as shown in FIG. 3, and are rotated 90° beneath sleeve shoulders 41 to tighten the seat 38 onto such sleeve. The seat is locked against turning during operation of the valve by spot welding it to the sleeve at a plurality of radially spaced welds 43.

An upper valve seat member 44 in the form of an annular ring is releasably attached to the lower seat member 38 by bolts 45 so that the outer surfaces of such valve seat members abut the wall of the discharge port 14, as shown in FIG. 1A. The bolts extend into threaded holes in the lower seat member and the heads of such bolts are covered by threaded plastic inserts 47 to enable them to be removed after reactor liquid forms a hard coating over the bolt holes. A rubber O-ring 46 seals the interface between the valve seat members 38 and 44.

An annular valve plug 48 cooperates with the upper valve seat member 44 in sealing off the discharge conduit 16 from the interior of the reaction vessel. In its closed position the valve plug fits within a vertical discharge passage extending through the upper valve seat member 44 between a valve inlet opening at top and a valve outlet opening at the bottom of the lower seat member 38. The valve plug 48 has a substantially vertical outer side surface 50 which is spaced from a substantially vertical inner seat surface 52 on the valve seat member 44 a small clearance distance of about 0.01 inch in the closed position of the valve. This clearance space is sealed by three sealing rings 54 of elastic material, such as rubber O-rings, each mounted within one of three annular grooves 56 provided in the inner seat surface 52. These sealing rings form a passive seal and are not expanded outward by fluid pressure passages communicating with the grooves, and the valve plug 48 is solid so as to be free of any fluid passages therein.

As shown in FIG. 2 each of the grooves 56 is provided with a restricted inlet opening bounded by a pair of inwardly projecting retainer ridges 58. The sealing rings 54 are held in the grooves by such retainer ridges after the rings are inserted into the grooves through the restricted inlet openings. The circular cross section of the O-ring 54 is distorted into the oval shape shown by engagement with the valve plug surface 50 to form a liquid tight seal.

The valve plug 48 is provided with a substantially flat top surface 60 which is coplanar with the top surface of the upper seat member 44 in the closed position. A tapered side surface 62 having a taper of about 10° is provided adjacent the bottom end of the plug, extending downwardly and inwardly from the vertical outer side surface 50. The tapered surface 62 functions to center the plug in the valve inlet opening at the top of the upper seat 44 when such plug is moved downward from its open position 48', shown in dashed lines, to the closed position 48, shown in solid lines.

The valve plug 48 is connected to and operated by a power-driven valve stem or actuator rod 64 which extends from the bottom of the plug through the valve outlet centrally of the lower valve seat 38 at the upper end of conduit 16 and down out through the vertical bore 20 of boss 18.

The connecting means by which the upper end of valve stem 64 is connected to valve body 48 is illustrated particularly in FIG. 1A. It includes an annular connector member 66 having a central bore which is internally threaded to receive the threaded upper end of actuator rod 64. The connector has an annular outer flange which mounts bolts 68. These bolts engage threaded openings in the bottom of the valve plug 48 thereby releasably securing the plug to such connector and actuator rod.

The upper surface of connector 66 in the area around its central opening is provided with stepped shoulders 70 which align the connector within a complementary shaped recess 72 in the center of the bottom of the plug.

Figure 4:
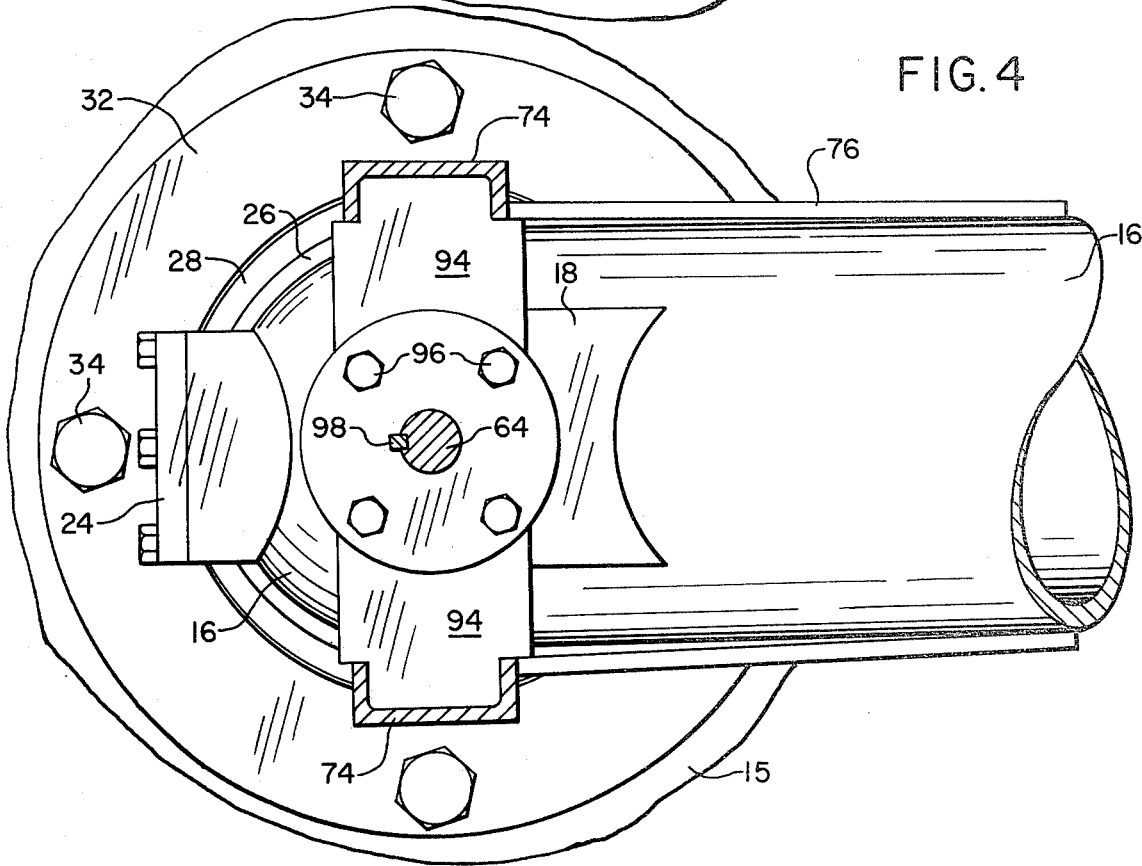
FIG. 4 is a transverse sectional view taken along line 4—4 of FIG. 1B illustrating the construction of the valve actuating means.

The lower end of valve stem or actuator rod 64 is connected to a reciprocating drive through linkages illustrated in FIGS. 1B and 4.

The valve stem and drive assemblies are supported on a pair of vertically arranged, laterally spaced, channel iron supports 74. The upper ends of these may be welded to support ring 26 on conduit 16. Their intermediate portions are braced by means of gussets 76 which are connected also to the side surfaces of conduit 16.

Valve stem 64 passes through the stepped bores of boss 18, the lowermost bore 22 containing an upper valve stem bushing 78, a quantity of braided packing 80 and a packing gland 82, thereby sealing off the conduit.

A pair of cam actuated limit switches 84 and 86 are associated with the intermediate segment of the valve stem or actuating rod 64 and control its reciprocating movement in the path of double arrow 85 between the open and closed positions of the valve. These limit switches are operated by a finger 87 on valve stem 64. Alternatively the limit switches may be magnetic reed switches operated by a magnet in place of finger 87.

The valve stem 64 is further braced and prevented from turning by a lower bushing 88. This bushing includes an annular lower flange 90 and a bushing backing plate 92, bolted to each other and to a bushing support 94, which bridges channel supports 74 by means of bolts 96.

Bushing 88 is provided with a longitudinal keyway which receives a key 98 mounted in the valve stem. This prevents turning of the valve stem during its operation.

The lower end of valve stem 64 is connected to its drive by an assembly which also is illustrated in FIG. 1B.

A reversible rotary air motor 100 is mounted on a support platform or bracket 102 which is braced and supported by gusset plates 104 connected at one end to the platform and at the other end to channels 74.

The drive shaft of motor 100 is coupled to a conventional torque coupling 106. The shaft of the latter connects with a conventional screw jack 108. The housing of the screw jack is bolted to platform 102, thereby providing further support.

Screw jack 108 has a hand wheel 110 which permits manual adjustment.

The lower end of the jack screw shaft 112 is received in a sleeve 114. Its upper end is connected through a coupling 116 to the lower end of valve stem 64, thereby causing raising and lowering of the valve stem in the path of arrow 85 upon extension and retraction of the screw shaft of the screw jack.

Air motor 100 is electrically controlled through an electric circuit which includes microswitches 84 and 86 as well as a time delay switch, not illustrated.

During the raising and lowering of the valve stem or actuator rod 64 to open and close the dump valve, the outer plug surface 50 slides across the inner valve seat surface 52 so that such surfaces wipe each other to remove any material deposited thereon including any hardened coating of the reactor liquid flowing through such valve. Most of the coating on the outer plug side surface 50 is removed by the scraping action of the corner at the top of the upper seat member. Thus the valve is self-cleaning.

OPERATION

When the reaction carried out in reactor 10 has been completed, and it is desired to discharge the contents through conduit 16, air motor 100 is energized in a direction which advances screw jack 108 upward and accordingly lifts valve stem 64 until valve plug 48 assumes its dashed line position 48' of FIG. 1A. This separates the outer side surface 50 of the plug from the inner valve seat surface 52 of the upper valve seat and opens the passageway through the valve. Upper limit switch 84 is engaged by finger 87 and shuts off the air motor when the valve is fully open. When it is desired to close the valve, air motor 100 is started in the reverse direction. It continues to run until shut off by limit switch 86 when such switch is engaged by finger 87.

When it is desired to replace the upper valve seat 44 or the valve plug 48, the valve may be disassembled quickly and easily. This is accomplished by removing bolts 45 and 68, thereby separating the upper and lower valve seat members as well as the plug and connector 66.

In addition the lower valve seat ring 38 is removed by first melting to break the welds 43 and thereafter giving the seat ring a twist to register the teeth 40 of the valve seat with slots 44. The new or renewed elements then may be inserted and the procedure reversed to assemble the valve body.

It will be obvious to those having ordinary skill in the art that many changes may be made in the above-described preferred embodiment of the invention without departing from the principles of the invention. Therefore, the scope of the invention should only be determined by the following claims.

We claim:

1. A dump valve apparatus for removing liquid from a container tank, in which the improvement comprises:
   a dump valve having a valve inlet opening and a valve outlet opening;
   a valve seat having a discharge passage through which said liquid is drained from said tank, said discharge passage being defined by a substantially vertical inner valve seat surface and being axially aligned with said valve inlet and outlet openings;
   a movable valve plug adapted to fit within said discharge passage in a closed position, said valve plug being solid so as to be free of fluid passages therein and having a substantially vertical outer plug surface which slides across said inner seat surface during opening and closing of the valve; seal means for forming a liquid tight seal between said inner seat surface and said outer plug surface in the closed position of said plug, said inner seat surface and said outer plug surface wiping each other to remove material deposited thereon when said plug slides across said seat surface to enable sealing, said seal means including a plurality of elastic sealing members mounted on said valve seat within a plurality of annular grooves in said inner seat surface, each said groove having a restricted opening at the inner seat surface which is of less width than the groove to retain the sealing member within the groove after it is inserted into said groove through said restricted opening; and
   actuator means attached to said valve plug for raising and lowering the valve plug between its open and closed positions.

2. Valve apparatus in accordance with claim 1 in which the actuator means includes an actuator rod extending from the valve plug through the valve outlet opening to an actuator mechanism capable of raising the valve plug to its open position against the pressure of liquid within the tank.

3. Valve apparatus in accordance with claim 1 including means for attaching the dump valve to the bottom of a chemical reactor tank so that the valve plug is raised into said tank in the open position of the valve to enable liquid to drain from said tank.

4. Valve apparatus in accordance with claim 3 in which the valve plug includes a tapered outer surface portion extending downward and inward from a cylindrical outer surface portion, and the valve seat is in the form of an annualar upper ring having said inner seat surface provided thereon and releasably secured to an annular lower ring of substantially the same inner diameter so that in the closed position of the valve plug its cylindrical outer surface extends coextensively with said upper ring while its tapered outer surface extends coextensively with said lower ring.

5. Valve apparatus in accordance with claim 1 in which the plug includes a tapered outer surface portion which extends downward and inward from the vertical outer plug surface to the lower end of the plug.

6. A dump valve apparatus for removing liquid from a container tank, in which the improvement comprises:

a dump valve having a valve inlet opening and a valve outlet opening;

a valve seat having a discharge passage through which said liquid is drained from said tank, said discharge passage being defined by a substantially vertical inner valve seat surface and being axially aligned with said valve inlet and outlet openings, said valve seat including an annular upper seat ring whose outer surface abuts the wall of a discharge port of the container tank, and an annular lower seat ring to which the upper ring is releasably fastened;

a movable valve plug adapted to fit within said discharge passage in a closed position, said valve plug being solid so as to be free of fluid passages therein and having a substantially vertical outer plug surface which slides across said inner seat surface during opening and closing of the valve;

seal means for forming a liquid tight seal between said inner seat surface and said outer plug surface in the closed position of said plug, said inner seat surface and said outer plug surface wiping each other to remove material deposited thereon when said plug slides across said seat surface to enable sealing, said seal means including at least one elastic sealing member mounted on said valve seat at said inner seat surface; and actuator means attached to said valve plug for raising and lowering the valve plug between its open and closed positions.

7. Valve apparatus in accordance with claim 6 in which the lower ring is secured to the upper end of a discharge conduit and the actuator means includes an actuator rod extending from the plug through a sealed opening in the side of a bend in said conduit to an actuator mechanism outside of the conduit.

8. Valve apparatus in accordance with claim 7 in which the actuator rod is connected to a jack screw means for raising and lowering said rod.

9. Valve apparatus in accordance with claim 8 in which the jack screw means is operated by a reversible motor controlled by limit switches in response to movement of the actuator rod.

10. A chemical reactor apparatus in which the improvement comprises:

a chemical reactor tank having a liquid discharge port;

a dump valve connected to said discharge port, having a valve inlet opening and a valve outlet opening;

a valve seat having a discharge passage through which liquid is drained from said tank by way of said discharge port, said discharge passage being defined by a substantially vertical inner valve seat surface and being axially aligned with said valve inlet and outlet openings;

a moveable valve plug adapted to fit within said discharge passage in a closed position and being free of fluid passages therein; and seal means for forming a liquid tight seal between said plug and the inner seat surface around said plug in the closed position of the plug, said seal means including a plurality of elastic sealing members mounted on said valve seat within a plurality of grooves in said inner seat surface, each said groove having a restricted opening at the inner seat surface which is of less width than the groove to retain the sealing member within the groove after it is inserted into said groove through said restricted opening.

11. A reactor apparatus in accordance with claim 10 in which the valve plug has a substantially vertical outer side surface which slides across the inner seat surface during opening and closing of the valve, said inner seat surface and said outer plug side surface wiping each other to remove material deposited thereon when said plug slides across said seat surface to enable sealing.

12. A reactor apparatus in accordance with claim 11 in which the valve seat has an outer surface which abuts the wall of the discharge port of the tank.

* * * * *